US012548283B2

(12) United States Patent
Kamon

(10) Patent No.: US 12,548,283 B2
(45) Date of Patent: Feb. 10, 2026

(54) MEDICAL IMAGE PROCESSING APPARATUS, METHOD, AND PROGRAM

(71) Applicant: FUJIFILM Corporation, Tokyo (JP)

(72) Inventor: Shumpei Kamon, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 292 days.

(21) Appl. No.: 18/366,635

(22) Filed: Aug. 7, 2023

(65) Prior Publication Data
US 2023/0394780 A1 Dec. 7, 2023

Related U.S. Application Data

(63) Continuation of application No. PCT/JP2022/006858, filed on Feb. 21, 2022.

(30) Foreign Application Priority Data

Feb. 25, 2021 (JP) .................. 2021-028422

(51) Int. Cl.
G06K 9/00 (2022.01)
G06T 7/00 (2017.01)
(Continued)

(52) U.S. Cl.
CPC .......... *G06V 10/273* (2022.01); *G06T 7/0016* (2013.01); *G16H 30/40* (2018.01);
(Continued)

(58) Field of Classification Search
CPC ........ G16H 30/40; G16H 20/40; G16H 30/20; G16H 50/20; G06T 2207/10068;
(Continued)

(56) References Cited

U.S. PATENT DOCUMENTS 11,272,830 B2  3/2022  Kamon
11,436,726 B2 * 9/2022  Kamon ............ A61B 1/000094
(Continued)

FOREIGN PATENT DOCUMENTS

CN  110461209  11/2019
CN  110663251  1/2020
(Continued)

OTHER PUBLICATIONS

"International Search Report (Form PCT/ISA/210) of PCT/JP2022/006858", mailed on Apr. 5, 2022, with English translation thereof, pp. 1-5.
(Continued)

*Primary Examiner* — Atiba O Fitzpatrick
(74) *Attorney, Agent, or Firm* — JCIPRNET

(57) ABSTRACT

In a medical image processing apparatus including a processor, the processor sequentially acquires time-series medical images and causes a display unit to sequentially display the acquired medical images. Further, the processor performs a process of acquiring, based on the acquired medical images, information related to a position of a region of interest in the medical images and classifying the region of interest into a class among a plurality of classes, and displays class information indicating the class of the classified region of interest such that the class information is superimposed at a position of the region of interest in a medical image displayed on the display unit. Further, the processor changes a relative position of the superimposed class information with respect to the region of interest, in accordance with an elapsed time from recognition of the region of interest.

19 Claims, 9 Drawing Sheets

(51) Int. Cl.
*G06V 10/26* (2022.01)
*G16H 30/40* (2018.01)

(52) U.S. Cl.
CPC .............. *G06T 2207/10068* (2013.01); *G06T 2207/30096* (2013.01); *G06V 2201/03* (2022.01)

(58) Field of Classification Search
CPC ......... G06T 2207/30096; G06T 7/0012–0016; G06T 2207/10064–10136; G06T 2207/30004–30104; G06T 7/10–194; G06T 2207/20021; G06T 2207/20112–20168; G06T 2207/30032; G06T 2210/41; G06T 2210/12; G06T 2200/24; A61B 1/000094; A61B 1/0005; A61B 8/12; A61B 10/04; A61B 1/2676; A61B 5/7485; G06V 10/764; G06V 2201/03–034; G06V 10/25–273; G06V 20/49; G06V 20/695; G06V 40/162; G06V 20/80; G06V 20/698; G06V 2201/032; G06V 10/422–426; G06K 9/6224; G01N 33/4833; G01N 15/10; G01N 2015/1006; G01N 33/505; G01N 33/5026; G01N 2015/1081
See application file for complete search history.

(56) References Cited

U.S. PATENT DOCUMENTS

| | | | |
|---|---|---|---|
| 11,616,931 | B2 | 3/2023 | Oosake |
| 11,633,084 | B2 | 4/2023 | Hirasawa et al. |
| 11,985,449 | B2 | 5/2024 | Oosake |
| 2016/0183925 | A1* | 6/2016 | Kim ..................... A61B 8/523 600/440 |
| 2019/0069757 | A1* | 3/2019 | Iwaki .................. A61B 1/0005 |
| 2019/0388175 | A1* | 12/2019 | Tatsuta ................ G02B 23/24 |
| 2020/0037856 | A1 | 2/2020 | Watanabe |
| 2020/0069160 | A1* | 3/2020 | Oosake ............. A61B 1/000094 |
| 2021/0015343 | A1* | 1/2021 | Uyama ............... A61B 1/00048 |
| 2021/0030392 | A1* | 2/2021 | Dmitrieva ............. A61B 8/463 |
| 2021/0342592 | A1* | 11/2021 | Oosake .............. A61B 1/00045 |
| 2021/0366110 | A1* | 11/2021 | Oosake ................. G06T 7/0012 |
| 2022/0160335 | A1* | 5/2022 | Matsumoto .............. A61B 8/52 |
| 2022/0346885 | A1* | 11/2022 | Kunio .................. A61B 5/7267 |
| 2023/0009335 | A1* | 1/2023 | Thienphrapa ........ A61B 1/0005 |
| 2023/0181001 | A1* | 6/2023 | Usuda ............. A61B 1/000094 382/128 |
| 2024/0259534 | A1 | 8/2024 | Oosake |
| 2025/0095197 | A1* | 3/2025 | Endo ........................ G06T 7/73 |

FOREIGN PATENT DOCUMENTS

| | | |
|---|---|---|
| CN | 112055555 | 12/2020 |
| JP | 2007185215 | 7/2007 |
| JP | 2015198806 | 11/2015 |
| JP | 2020073081 | 5/2020 |
| WO | 2017203560 | 11/2017 |
| WO | 2018179991 | 10/2018 |
| WO | 2018221033 | 12/2018 |
| WO | 2020040087 | 2/2020 |
| WO | 2020174747 | 9/2020 |
| WO | 2020183770 | 9/2020 |
| WO | 2021029153 | 2/2021 |

OTHER PUBLICATIONS

"Written Opinion of the International Searching Authority (Form PCT/ISA/237) of PCT/JP2022/006858", mailed on Apr. 5, 2022, with English translation thereof, pp. 1-8.

"Search Report of Europe Counterpart Application", issued on Jul. 10, 2024, pp. 1-8.

"Office Action of China Counterpart Application", issued on Oct. 30, 2025, with English translation thereof, p. 1-p. 19.

"Notice of Reasons for Refusal of Japan Counterpart Application", issued on Dec. 18, 2025, with English translation thereof, p. 1-p. 8.

* cited by examiner

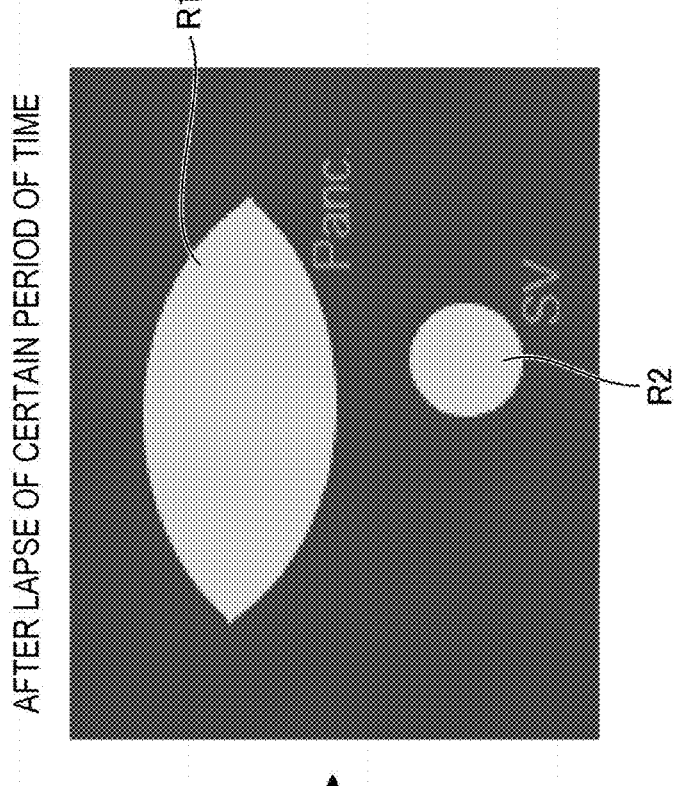
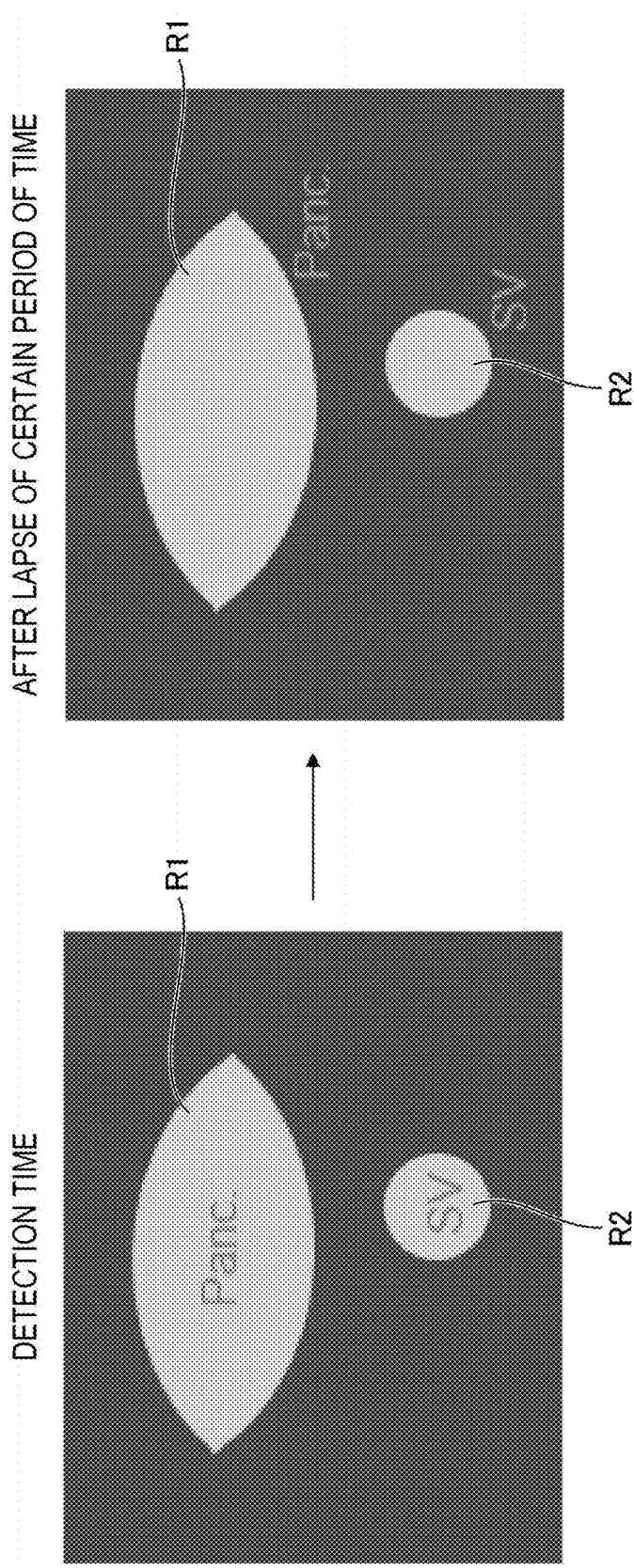

DETECTION TIME

AFTER LAPSE OF CERTAIN PERIOD OF TIME

AFTER LAPSE OF CERTAIN PERIOD OF TIME

AFTER LAPSE OF CERTAIN PERIOD OF TIME

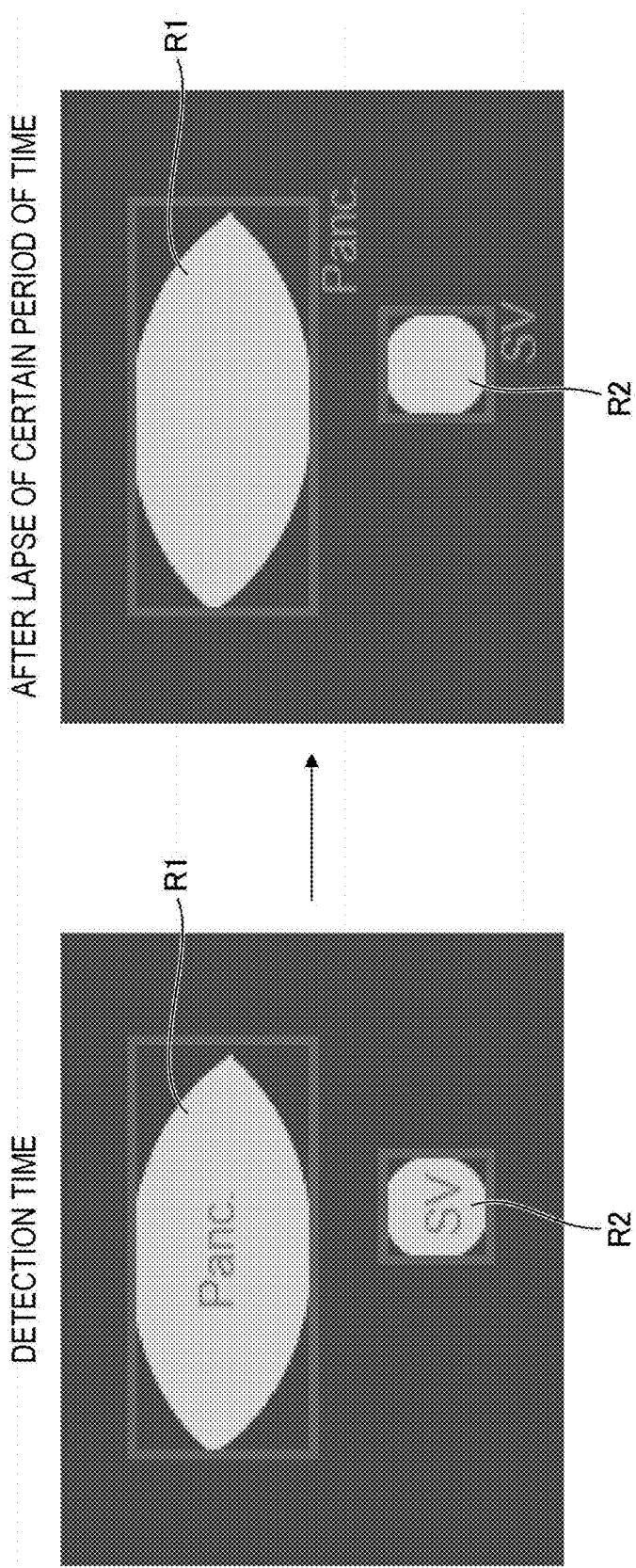

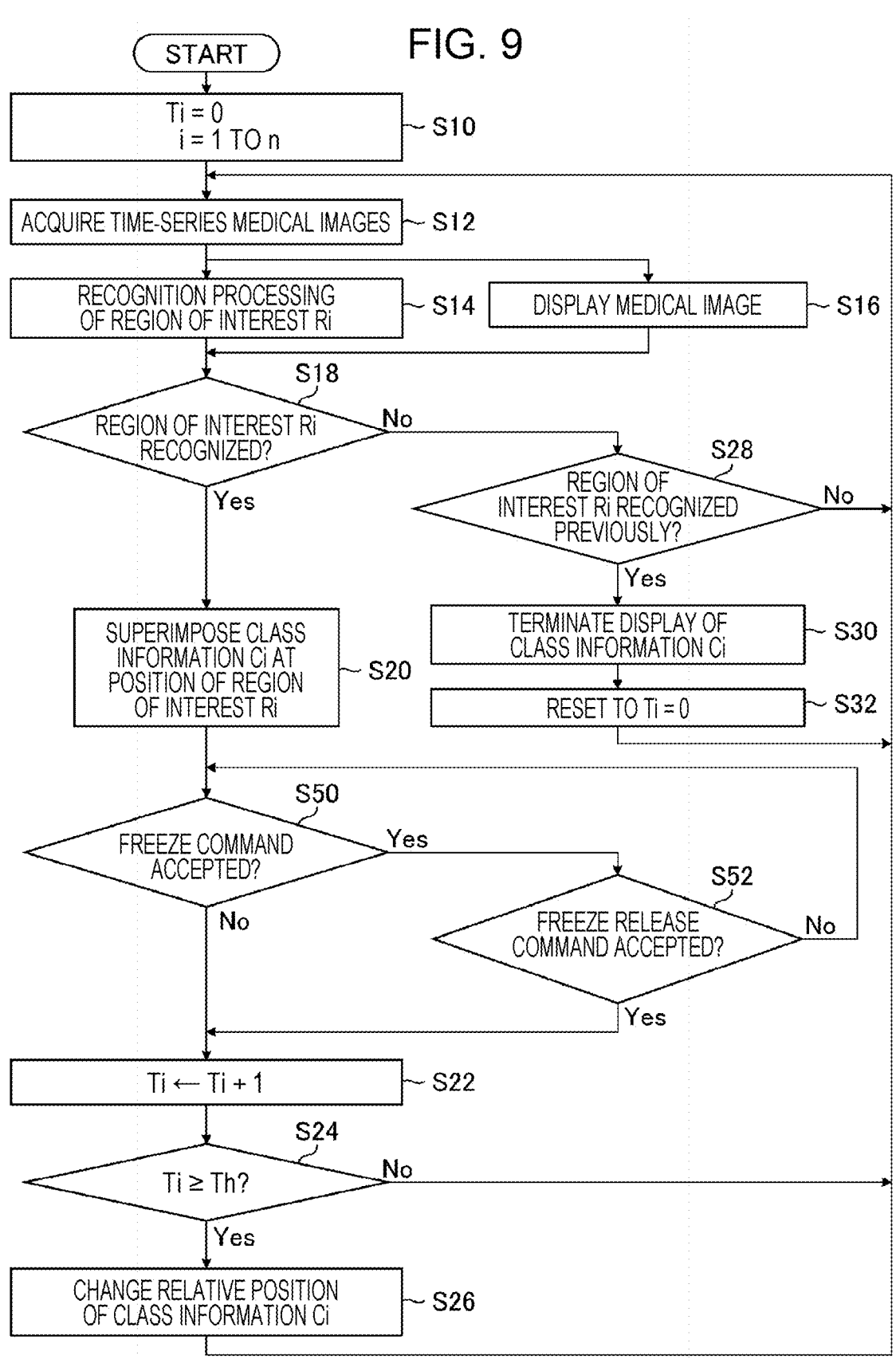

MEDICAL IMAGE PROCESSING APPARATUS, METHOD, AND PROGRAM

CROSS-REFERENCE TO RELATED APPLICATIONS

The present application is a Continuation of PCT International Application No. PCT/JP2022/006858 filed on Feb. 21, 2022 claiming priority under 35 U.S.C § 119(a) to Japanese Patent Application No. 2021-028422 filed on Feb. 25, 2021. Each of the above applications is hereby expressly incorporated by reference, in its entirety, into the present application.

BACKGROUND OF THE INVENTION

1. Field of the Invention

The present invention relates to a medical image processing apparatus, method, and program, and more specifically to a technique for notifying a user of useful information during observation of a medical image.

2. Description of the Related Art

An existing image processing apparatus including this type of function is proposed in WO2017/203560A.

An endoscopic image processing apparatus described in WO2017/203560A performs processing for sequentially receiving observation images of a subject and detecting a candidate lesion region from the observation images. When the candidate lesion region is continuously detected, the endoscopic image processing apparatus performs, by using a marker image, enhancement processing of the candidate lesion region in an observation image of the subject that is received after a first time period has elapsed from a timing at which detection of the candidate lesion region was started. When a second time period further elapses after the first time period has elapsed, the endoscopic image processing apparatus completes the enhancement processing, and performs notification processing to add a notification image (an icon indicating a flag) to a region outside the observation image in an image for display.

SUMMARY OF THE INVENTION

The marker image described in WO2017/203560A, which surrounds a detected candidate lesion region, is intended to highlight the candidate lesion region to prevent the candidate lesion region from being overlooked. The marker image is not information related to a class into which a region of interest in a medical image is classified. Further, the marker image surrounds the detected candidate lesion region with a frame such as a rectangular frame to highlight the candidate lesion region, and is not superimposed at the position of the candidate lesion region.

When the position of a region of interest and a class into which the region of interest is classified are detected from each of time-series medical images and the position of the region of interest and information related to the class of the region of interest are displayed, preferably, the information related to the class is superimposed at the position of the region of interest to make it easy for the user to view the information.

However, after the region of interest is detected, if the information related to the class of the region of interest is superimposed at the position of the region of interest, the display of the information related to the class can interfere with the user who is observing the region of interest.

The present invention has been made in view of such circumstances, and an object thereof is to provide a medical image processing apparatus, method, and program that can intelligibly present the position of a region of interest detected from time-series medical images and information on a class into which the region of interest is classified to a user without interfering with the user's observation.

To achieve the object described above, the invention according to a first aspect provides a medical image processing apparatus including a processor. The processor is configured to perform a medical image acquisition process for sequentially acquiring time-series medical images; first display control for causing a display unit to sequentially display the medical images; a process of recognizing, based on the sequentially acquired medical images, information related to a position of a region of interest in the medical images; a process of classifying the region of interest into a class among a plurality of classes, based on the sequentially acquired medical images; and second display control for displaying class information indicating the class of the classified region of interest such that the class information is superimposed at a position of the region of interest in a medical image displayed on the display unit among the medical images. The second display control changes a relative position of the superimposed class information with respect to the region of interest, in accordance with an elapsed time from recognition of the region of interest.

According to the first aspect of the present invention, class information indicating a class into which a region of interest detected from time-series medical images is classified is superimposed at the position of the detected region of interest, thereby making it possible to intelligibly present the position of the region of interest and the class of the classified region of interest to a user. In addition, since the relative position of the superimposed class information with respect to the region of interest is changed in accordance with the elapsed time from the recognition of the region of interest, it is possible to prevent the class information from interfering with the user's observation.

In a medical image processing apparatus according to a second aspect of the present invention, preferably, the second display control changes the relative position of the class information in accordance with the elapsed time, such that the relative position of the class information is changed in a direction away from the position of the region of interest. This can prevent the class information from interfering with the user during observation of the region of interest.

In a medical image processing apparatus according to a third aspect of the present invention, preferably, the second display control fixes a relative position, with respect to the region of interest, of class information indicating one or more specific classes among the plurality of classes.

For example, in the case of a region of interest having a large size, class information superimposed at the position of the region of interest does not interfere with observation or is less likely to interfere with observation. Thus, class information indicating the class (specific class) of the region of interest can remain fixed regardless of the elapsed time from recognition.

In a medical image processing apparatus according to a fourth aspect of the present invention, preferably, the second display control changes the relative position of the class information in accordance with the elapsed time, in a manner that changes in accordance with the class of the classified region of interest.

Each region of interest detected from the medical image has different surrounding conditions from any other region of interest (for example, different positional relationship with any other region of interest). Accordingly, when the class information superimposed at the position of the region of interest is changed in accordance with the elapsed time, in a manner (for example, in a direction or the like in which the class information is moved) that, preferably, changes so as not to interfere with the observation of any other region of interest.

In a medical image processing apparatus according to a fifth aspect of the present invention, preferably, the second display control changes the relative position of the class information in accordance with the elapsed time, such that a display form of the class information is also changed to another display form.

For example, when the region of interest is first detected, class information indicating the classification of the region of interest is displayed as a marker, and subsequently the marker is changed to text information in accordance with the elapsed time. Alternatively, when the region of interest is first detected, class information indicating the classification of the region of interest is displayed as text information, and subsequently the text information is changed to a marker in accordance with the elapsed time.

In a medical image processing apparatus according to a sixth aspect of the present invention, the class information includes at least one of text information, a marker, or a geometric shape indicating the class of the classified region of interest.

In a medical image processing apparatus according to a seventh aspect of the present invention, preferably, the second display control causes the display unit to display highlight information for highlighting the region of interest and fixes a relative position of the highlight information with respect to the region of interest. The highlight information for highlighting the region of interest can be, for example, a rectangular frame surrounding the region of interest. Further, drawing the rectangular frame with a color that is set for the class of the region of interest makes it possible to add class information to the rectangular frame.

In a medical image processing apparatus according to an eighth aspect of the present invention, preferably, the processor is configured to perform an acceptance process for accepting a freeze command from a user operating unit, the first display control performs a process of switching sequential display of the medical images to be displayed on the display unit to fixed display of one of the medical images in response to acceptance of the freeze command, and the second display control fixes the relative position of the class information with respect to the region of interest during a period of time of the fixed display.

In a medical image processing apparatus according to a ninth aspect of the present invention, preferably, the medical images are ultrasound images. In the case of an ultrasound image, a plurality of regions of interest (for example, an organ, a thick blood vessel, or the like) are simultaneously detected, and a plurality of pieces of class information each corresponding to one of the plurality of regions of interest are displayed, which makes it likely that the plurality of pieces of class information interfere with the user's observation. Accordingly, in the case of an ultrasound image, it is effective to change the relative position of class information with respect to each region of interest in accordance with the elapsed time from the detection of the region of interest.

A medical image processing method according to a tenth aspect of the present invention includes a step of sequentially acquiring time-series medical images; a first display control step of causing a display unit to sequentially display the medical images; a step of recognizing, based on the sequentially acquired medical images, information related to a position of a region of interest in the medical images; a step of classifying the region of interest into a class among a plurality of classes, based on the sequentially acquired medical images; and a second display control step of displaying class information indicating the class of the classified region of interest such that the class information is superimposed at a position of the region of interest in a medical image displayed on the display unit among the medical images, the second display control step changing a relative position of the superimposed class information with respect to the region of interest, in accordance with an elapsed time from recognition of the region of interest, wherein processing of each step is executed by a processor.

In a medical image processing method according to an eleventh aspect of the present invention, preferably, the second display control step changes the relative position of the class information in accordance with the elapsed time, such that the relative position of the class information is changed in a direction away from the position of the region of interest.

In a medical image processing method according to a twelfth aspect of the present invention, preferably, the second display control step fixes a relative position, with respect to the region of interest, of class information indicating one or more specific classes among the plurality of classes.

In a medical image processing method according to a thirteenth aspect of the present invention, preferably, the second display control step changes the relative position of the class information in accordance with the elapsed time, in a manner that changes in accordance with the class of the classified region of interest.

In a medical image processing method according to a fourteenth aspect of the present invention, preferably, the second display control step changes the relative position of the class information in accordance with the elapsed time, such that a display form of the class information is also changed to another display form.

In a medical image processing method according to a fifteenth aspect of the present invention, the class information includes at least one of text information, a marker, or a geometric shape indicating the class of the classified region of interest.

In a medical image processing method according to a sixteenth aspect of the present invention, preferably, the second display control step causes the display unit to display highlight information for highlighting the region of interest and fixes a relative position of the highlight information with respect to the region of interest.

A medical image processing method according to a seventeenth aspect of the present invention preferably includes a step of accepting a freeze command from a user operating unit, the first display control step switches sequential display of the medical images to be displayed on the display unit to fixed display of one of the medical images in response to acceptance of the freeze command, and the second display control step fixes the relative position of the class information with respect to the region of interest during a period of time of the fixed display.

In a medical image processing method according to an eighteenth aspect of the present invention, preferably, the medical images are ultrasound images.

An invention according to a nineteenth aspect is a medical image processing program for causing the processor to execute processing of each step in the medical image processing method according to any one of the tenth to eighteenth aspects.

According to the present invention, class information indicating a class into which a region of interest detected from time-series medical images is classified is superimposed at the position of the detected region of interest, thereby making it possible to intelligibly present the position of the region of interest and the class of the classified region of interest to a user. In addition, since the relative position of the superimposed class information with respect to the region of interest is changed in accordance with the elapsed time from the recognition of the region of interest, it is possible to prevent the class information from interfering with the user's observation.

BRIEF DESCRIPTION OF THE DRAWINGS

FIGS. 3A and 3B are diagrams illustrating a first example display of a medical image and class information displayed on a monitor;

FIGS. 6A and 6B are diagrams illustrating a fourth example display of a medical image and class information displayed on the monitor;

FIG. 9 is a flowchart illustrating a third embodiment of a medical image processing method according to the present invention.

DESCRIPTION OF THE PREFERRED EMBODIMENTS

Preferred embodiments of a medical image processing apparatus, method, and program according to the present invention will be described hereinafter with reference to the accompanying drawings.

Figure 1:
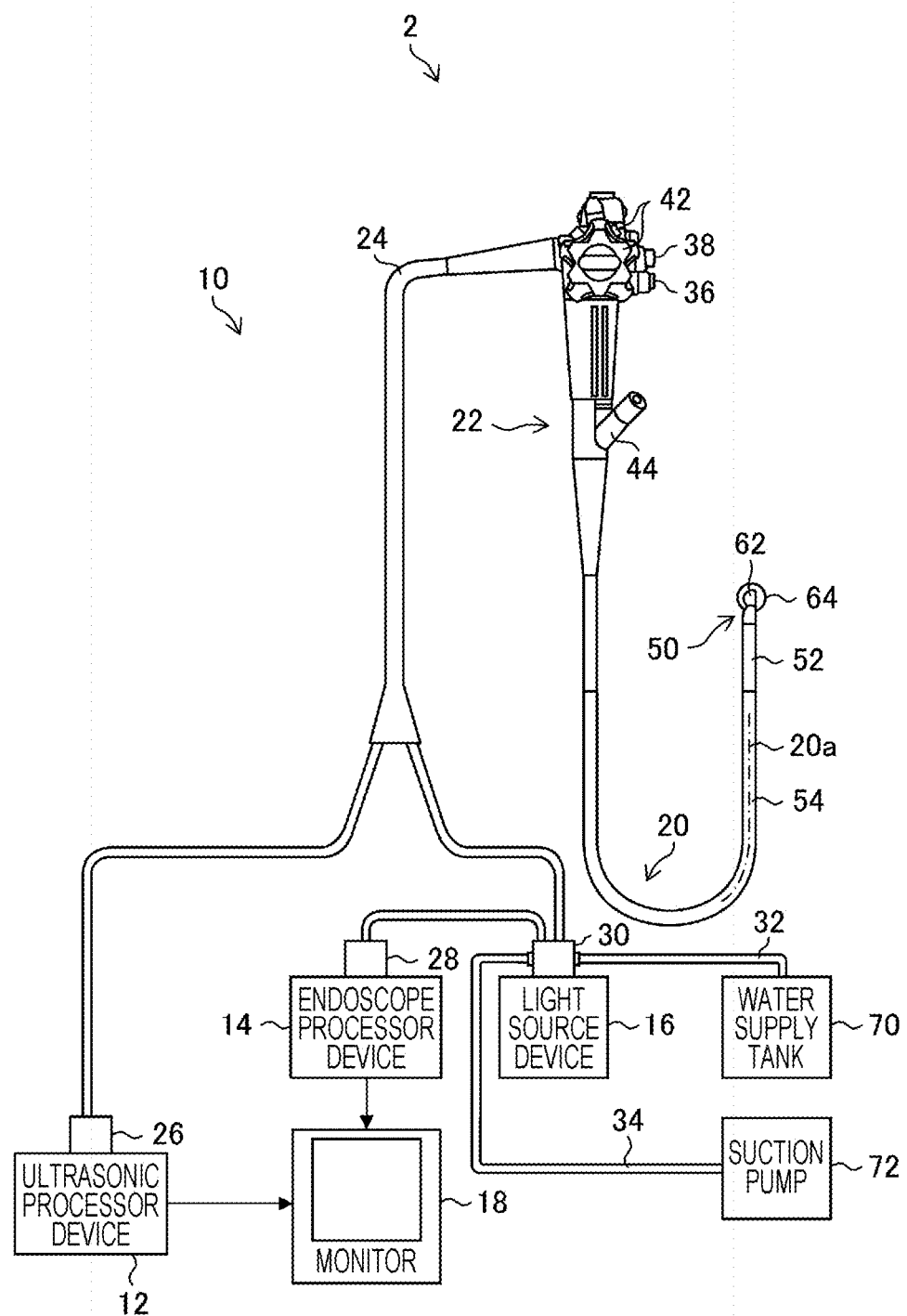
FIG. 1 is a schematic diagram illustrating an overall configuration of an ultrasonic endoscope system including a medical image processing apparatus according to the present invention.

Overall Configuration of Ultrasonic Endoscope System Including Medical Image Processing Apparatus FIG. 1 is a schematic diagram illustrating an overall configuration of an ultrasonic endoscope system including a medical image processing apparatus according to the present invention.

As illustrated in FIG. 1, an ultrasonic endoscope system 2 includes an ultrasound scope 10, an ultrasonic processor device 12 that generates an ultrasound image, an endoscope processor device 14 that generates an endoscopic image, a light source device 16 that supplies illumination light to the ultrasound scope 10 to illuminate the inside of a body cavity, and a monitor 18 that displays the ultrasound image and the endoscopic image.

The ultrasound scope 10 includes an insertion section 20 to be inserted into a body cavity of a subject, a handheld operation section 22 coupled to a proximal end portion of the insertion section 20 and to be operated by an operator, and a universal cord 24 having one end connected to the handheld operation section 22. The other end of the universal cord 24 is provided with an ultrasonic connector 26 to be connected to the ultrasonic processor device 12, an endoscope connector 28 to be connected to the endoscope processor device 14, and a light source connector 30 to be connected to the light source device 16.

The ultrasound scope 10 is detachably connected to the ultrasonic processor device 12, the endoscope processor device 14, and the light source device 16 through the connectors 26, 28, and 30, respectively. The light source connector 30 is also connected to an air/water supply tube 32 and a suction tube 34.

The monitor 18 receives respective video signals generated by the ultrasonic processor device 12 and the endoscope processor device 14 and displays an ultrasound image and an endoscopic image. The ultrasound image and the endoscopic image can be displayed such that only one of the images is appropriately switched and displayed on the monitor 18 or both of the images are simultaneously displayed.

The handheld operation section 22 is provided with an air/water supply button 36 and a suction button 38, which are arranged side by side, and is also provided with a pair of angle knobs 42 and a treatment tool insertion port 44.

The insertion section 20 has a distal end, a proximal end, and a longitudinal axis 20a. The insertion section 20 is constituted by a tip main body 50, a bending part 52, and an elongated long flexible soft part 54 in this order from the distal end side of the insertion section 20. The tip main body 50 is formed by a hard member. The bending part 52 is coupled to the proximal end side of the tip main body 50. The soft part 54 couples the proximal end side of the bending part 52 to the distal end side of the handheld operation section 22. That is, the tip main body 50 is disposed on the distal end side of the insertion section 20 in the direction of the longitudinal axis 20a. The bending part 52 is remotely operated to bend by turning the pair of angle knobs 42 disposed in the handheld operation section 22. As a result, the tip main body 50 can be directed in a desired direction.

The tip main body 50 is attached with an ultrasound probe 62 and a bag-like balloon 64 that covers the ultrasound probe 62. The balloon 64 can expand or contract when water is supplied from a water supply tank 70 or the water in the balloon 64 is sucked by a suction pump 72. The balloon 64 is inflated until the balloon 64 abuts against the inner wall of the body cavity to prevent attenuation of an ultrasound wave and an ultrasound echo (echo signal) during ultrasound observation.

The tip main body 50 is also attached with an endoscopic observation portion (not illustrated) having an illumination portion and an observation portion including an objective lens, an imaging element, and so on. The endoscopic observation portion is disposed behind the ultrasound probe 62 (on the handheld operation section 22 side).

Medical Image Processing Apparatus

Figure 2:
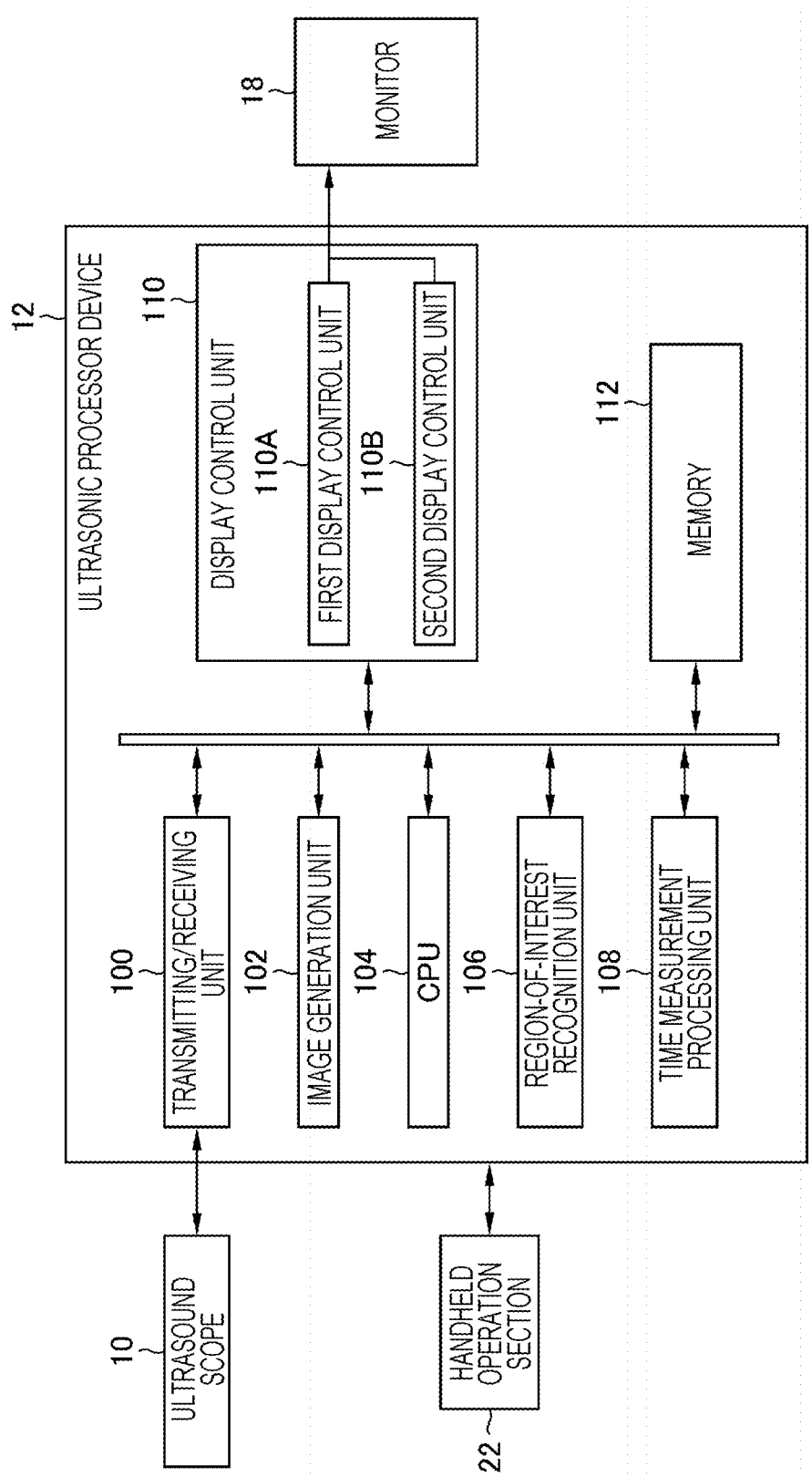
FIG. 2 is a block diagram illustrating an embodiment of an ultrasonic processor device functioning as the medical image processing apparatus according to the present invention.

FIG. 2 is a block diagram illustrating an embodiment of an ultrasonic processor device functioning as a medical image processing apparatus according to the present invention.

The ultrasonic processor device 12 illustrated in FIG. 2 recognizes a region of interest in a medical image on the basis of sequentially acquired time-series medical images and notifies a user of information indicating a recognition result of the region of interest. More specifically, the ultrasonic processor device 12 notifies the user of information indicating the recognition result to be displayed together with the medical image by changing the display form in accordance with the elapsed time from the recognition of the region of interest.

The ultrasonic processor device 12 illustrated in FIG. 2 is constituted by a transmitting/receiving unit 100, an image generation unit 102, a CPU (Central Processing Unit) 104, a region-of-interest recognition unit 106, a time measurement processing unit 108, a display control unit 110, and a memory 112. The processing of each unit is implemented by one or more processors.

The CPU 104 operates in accordance with various programs stored in the memory 112 and including a medical image processing program according to the present invention to perform overall control of the transmitting/receiving unit 100, the image generation unit 102, the region-of-interest recognition unit 106, the time measurement processing unit 108, and the display control unit 110, and functions as some of these units.

The transmitting/receiving unit 100 and the image generation unit 102, which function as a medical image acquisition processing unit, sequentially acquire time-series medical images.

A transmitting unit of the transmitting/receiving unit 100 generates a plurality of drive signals to be applied to a plurality of ultrasonic transducers of the ultrasound probe 62 of the ultrasound scope 10, assigns respective delay times to the plurality of drive signals on the basis of a transmission delay pattern selected by a scan control unit (not illustrated), and applies the plurality of drive signals to the plurality of ultrasonic transducers.

A receiving unit of the transmitting/receiving unit 100 amplifies a plurality of detection signals, each of which is output from one of the plurality of ultrasonic transducers of the ultrasound probe 62, and converts the detection signals from analog detection signals to digital detection signals (also referred to as RF (Radio Frequency) data). The RF data is input to the image generation unit 102.

The image generation unit 102 assigns respective delay times to the plurality of detection signals represented by the RF data on the basis of a reception delay pattern selected by the scan control unit and adds the detection signals together to perform reception focus processing. Through the reception focus processing, sound ray data in which the focus of the ultrasound echo is narrowed is formed.

The image generation unit 102 further corrects the sound ray data for attenuation caused by the distance in accordance with the depth of the reflection position of the ultrasound wave by using STC (Sensitivity Time Control), and then performs envelope detection processing by using a low pass filter or the like to generate envelope data. The image generation unit 102 stores envelope data for one frame or more preferably for a plurality of frames in a cine memory (not illustrated). The image generation unit 102 performs pre-process processing, such as Log (logarithmic) compression and gain adjustment, on the envelope data stored in the cine memory to generate a B-mode image.

In this way, the transmitting/receiving unit 100 and the image generation unit 102 sequentially acquire time-series B-mode images (hereafter referred to as "medical images").

The region-of-interest recognition unit 106 performs a process of recognizing information related to the position of a region of interest in a medical image on the basis of the medical image and a process of classifying the region of interest into a class among a plurality of classes on the basis of the medical image. The processes can be performed by, for example, AI (Artificial Intelligence).

In this example, various organs in medical images (tomographic images of B-mode images) are regions of interest, and examples of such organs include the pancreas, the main pancreatic duct, the spleen, the splenic vein, the splenic artery, and the gallbladder.

When sequentially receiving time-series medical images, the region-of-interest recognition unit 106 recognizes the position of a region of interest for each of the received medical images, outputs information related to the position, recognizes a class to which the region of interest belongs among a plurality of classes, and outputs information (class information) indicating the recognized class.

The position of the region of interest can be, for example, the center position of a rectangular shape surrounding the region of interest. In this example, the class information is information indicating a type of organ.

The time measurement processing unit 108 is a portion that measures the elapsed time from when a region of interest is detected by the region-of-interest recognition unit 106 to when the region of interest is no longer detected. If a plurality of regions of interest of different types are detected (recognized) by the region-of-interest recognition unit 106, the time measurement processing unit 108 individually measures an elapsed time indicating a detection period for each of the regions of interest.

The display control unit 110 is constituted by a first display control unit 110A that causes the monitor 18, which is a display unit, to display time-series medical images, and a second display control unit 110B that causes the monitor 18 to display information related to a region of interest.

The first display control unit 110A causes the monitor 18 to display the medical images sequentially acquired by the transmitting/receiving unit 100 and the image generation unit 102. In this example, a moving image indicating an ultrasound tomographic image is displayed on the monitor 18.

Further, the first display control unit 110A performs an acceptance process for accepting a freeze command from the handheld operation section 22 (user operating unit) of the ultrasound scope 10. For example, when a freeze button of the handheld operation section 22 is operated and a freeze command is accepted, the first display control unit 110A performs a process of switching sequential display of medical images to be displayed on the monitor 18 to fixed display of a single medical image (the medical image at the current time point).

The second display control unit 110B causes class information indicating the classification of the region of interest recognized by the region-of-interest recognition unit 106 to be superimposed at the position of the region of interest in the medical image displayed on the monitor 18. The second display control unit 110B changes the relative position of the superimposed class information with respect to the region of interest in accordance with the elapsed time from the recognition of the region of interest, which is measured by the time measurement processing unit 108.

Upon acceptance of a freeze command, the second display control unit 110B also fixes the relative position of the class information with respect to the region of interest for a period of time during which the medical image displayed on the monitor 18 is fixedly displayed as a still image.

The following describes an example display of objects displayed on the monitor 18 by using the second display control unit 110B, such as class information indicating the classification of a region of interest.

First Example Display

FIGS. 3A and 3B are diagrams illustrating a first example display of a medical image and class information displayed on the monitor.

FIG. 3A illustrates a screen of the monitor 18 at the time of detection of regions of interest R1 and R2, and FIG. 3B illustrates a screen of the monitor 18 after a certain period of time has elapsed since the detection of the regions of interest R1 and R2.

In FIGS. 3A and 3B, the region of interest R1 is the pancreas, and the region of interest R2 is the splenic vein.

As illustrated in FIG. 3A, at the time of detection (or within less than a certain period of time after detection) of the regions of interest R1 and R2, the text "Panc.", which is an abbreviation for pancreas, is superimposed as class information at the position of the region of interest R1 (the center position or a neighboring position thereof), and the text "SV", which is an acronym for splenic vein, is superimposed as class information at the position of the region of interest R2.

In this manner, if the regions of interest R1 and R2 are detected, the user can be notified of class information indicating the classification of the detected regions of interest R1 and R2. Preferably, the class information is superimposed near the center of each of the regions of interest R1 and R2, in particular, since accurate positions of the regions of interest R1 and R2 are required to be identified at timings at which the regions of interest R1 and R2 are detected.

Thereafter, as illustrated in FIG. 3B, when a certain period of time (for example, several seconds (about 1 to 2 seconds)) has elapsed since the detection of the regions of interest R1 and R2, the display of the class information (the text "Panc." and "SV") indicating the classification of the regions of interest R1 and R2 is changed (moved) in a direction away from the positions of the regions of interest R1 and R2. In the example of FIG. 3B, the class information (the text "Panc." and "SV") is moved to the outside of the regions of interest R1 and R2.

The constant display of class information near the center of a region of interest interferes with the diagnosis of the region of interest, which causes a problem. This problem can be overcome by moving the class information indicating the classification of the region of interest to the outside of the region of interest after a certain period of time has elapsed since the detection of the region of interest.

The method of moving the class information may be a method of discretely changing the position after a period of time (certain period of time) as described above, or a method of continuously shifting the position over time. In the example illustrated in FIGS. 3A and 3B, the class information is text information indicating an abbreviation of the type of the organ representing the region of interest. Alternatively, the class information may be text information indicating the full name of the type of the organ representing the region of interest.

Second Example Display

FIGS. 4A to 4D are diagrams illustrating a second example display of a medical image and class information displayed on the monitor.

Figure 4A:
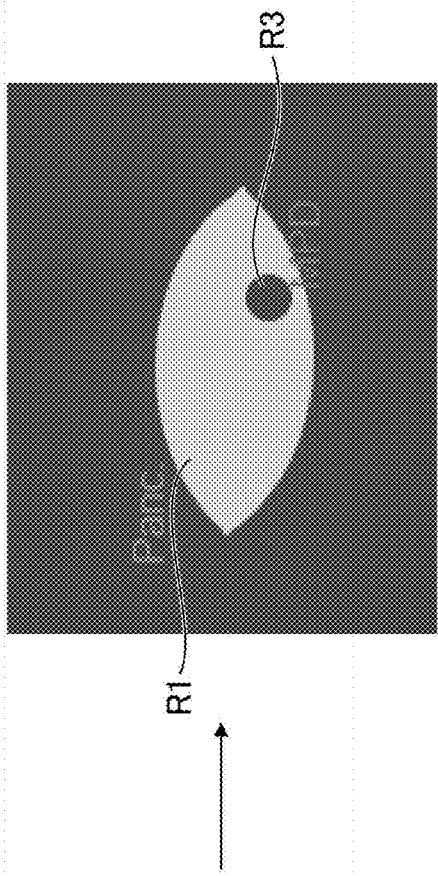
FIGS. 4A to 4D are diagrams illustrating a second example display of a medical image and class information displayed on the monitor.
Figure 4B:
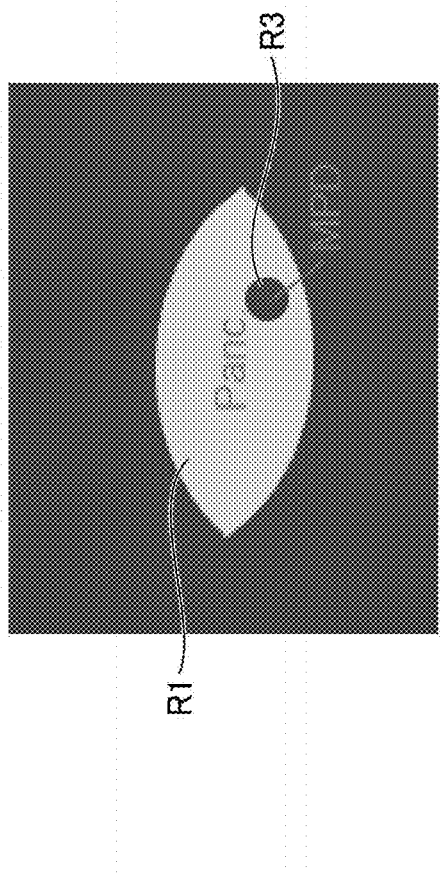
Figure 4C:
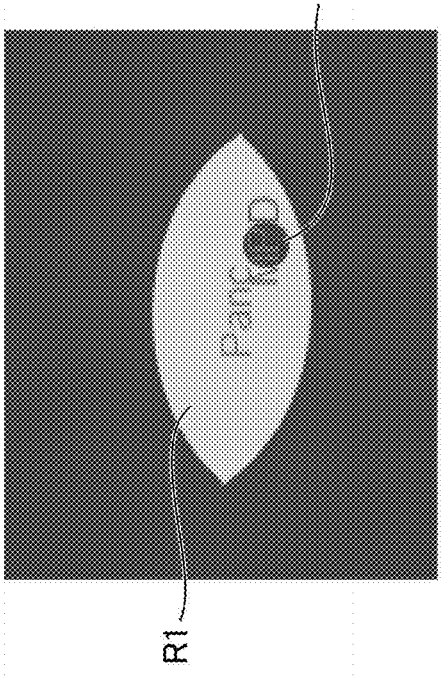
Figure 4D:
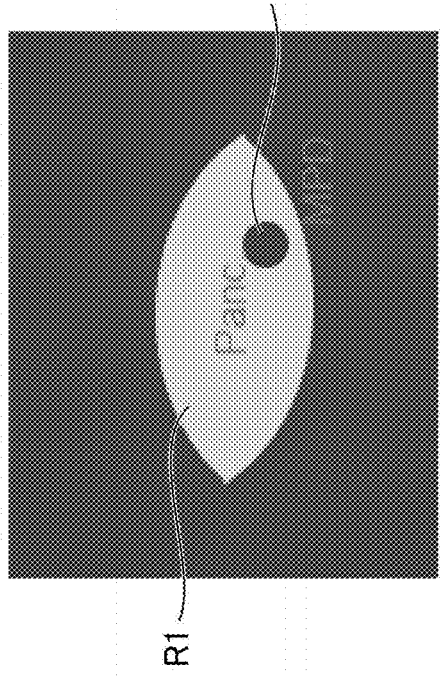

FIG. 4A illustrates a screen of the monitor 18 at the time of detection of regions of interest R1 and R3, and FIGS. 4B to 4D illustrate screens of the monitor 18 after a certain period of time has elapsed since the detection of the regions of interest R1 and R3.

In FIGS. 4A to 4D, the region of interest R1 is the pancreas, and the region of interest R3 is the main pancreatic duct.

As illustrated in FIG. 4A, at the time of detection of the regions of interest R1 and R3, the text "Panc.", which is an abbreviation for pancreases, is superimposed as class information at the position of the region of interest R1, and the text "MPD", which is an acronym for main pancreatic duct, is superimposed as class information at the position of the region of interest R3.

In the example illustrated in FIG. 4B, when a certain period of time has elapsed since the detection of the regions of interest R1 and R3, the class information (the text "Panc." and "MPD") indicating the classification of the regions of interest R1 and R3 is moved to the outside of the regions of interest R1 and R3.

In this case, the position of the class information (the text "Panc." and "MPD") is changed in accordance with the elapsed time in a manner that preferably changes in accordance with the class obtained by the classification. That is, in the example illustrated in FIG. 4B, the class information (the text "Panc.") indicating the classification of the region of interest R1 is moved to the upper left of the region of interest R1 in FIG. 4B, and the class information (the text "MPD") of the region of interest R3 is moved to the lower right of the region of interest R3 in FIG. 4B. The reason is that, when a plurality of pieces of class information are moved, these pieces of class information are not close to each other.

In the examples illustrated in FIGS. 4C and 4D, when a certain period of time has elapsed since the detection of the regions of interest R1 and R3, the class information (the text "MPD") of the region of interest R3 is moved to the outside of the region of interest R3, whereas the relative position of the class information (the text "Panc.") indicating the classification of the region of interest R1 with respect to the region of interest R3 is fixed. That is, class information indicating the classification of one or more specific classes (in this example, (the text "Panc.")) among a plurality of classes is displayed in a fixed manner such that the relative position of the class information indicating the classification of the specific class or classes with respect to the region of interest is not moved.

As illustrated in FIG. 4A, the region of interest R1 and the region of interest R3 are different in size. The region of interest R1 is relatively large, whereas the region of interest R3 is small. When the region of interest R3 is small, if the class information (the text "MPD") indicating the classification of the region of interest R3 is superimposed at the position of the small region of interest R3, the visibility of the region of interest R3 is greatly reduced. On the other hand, when the region of interest R1 is large, even if the class information (the text "Pane.") indicating the classification of the region of interest R1 is superimposed at the position of the large region of interest R1, the visibility of the region of interest R3 is less likely to be reduced.

In this manner, even if information indicating the classification of a region of interest is superimposed on the region of interest, the visibility of the region of interest is not significantly reduced for specific class information. Such specific class information may not be moved even after a certain period of time has elapsed since the detection of the region of interest.

The example display illustrated in FIG. 4D is different from the example display illustrated in FIG. 4C in that after the movement of the class information (the text "MPD"), the region of interest R3 and the class information (the text "MPD") are connected by a leader line to clarify the relationship therebetween.

Third Example Display

Figure 5A:
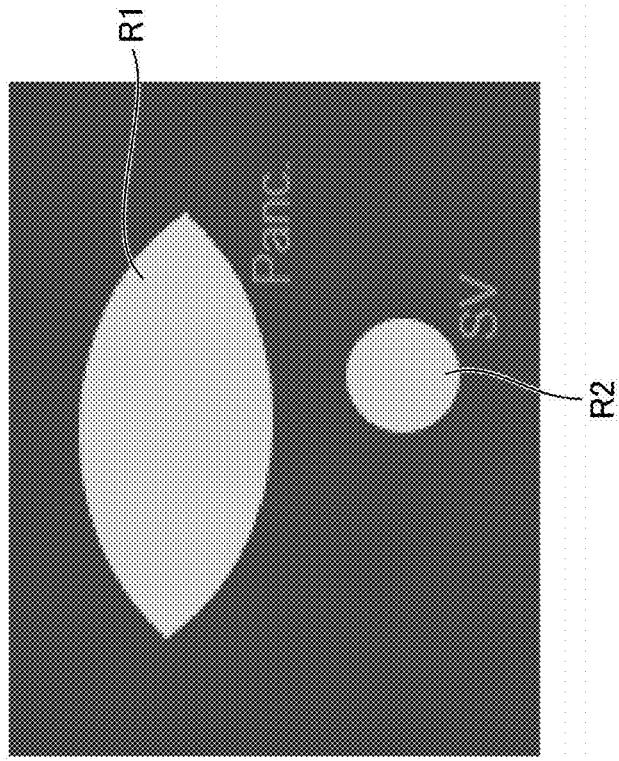
FIGS. 5A and 5B are diagrams illustrating a third example display of a medical image and class information displayed on the monitor.
Figure 5B:
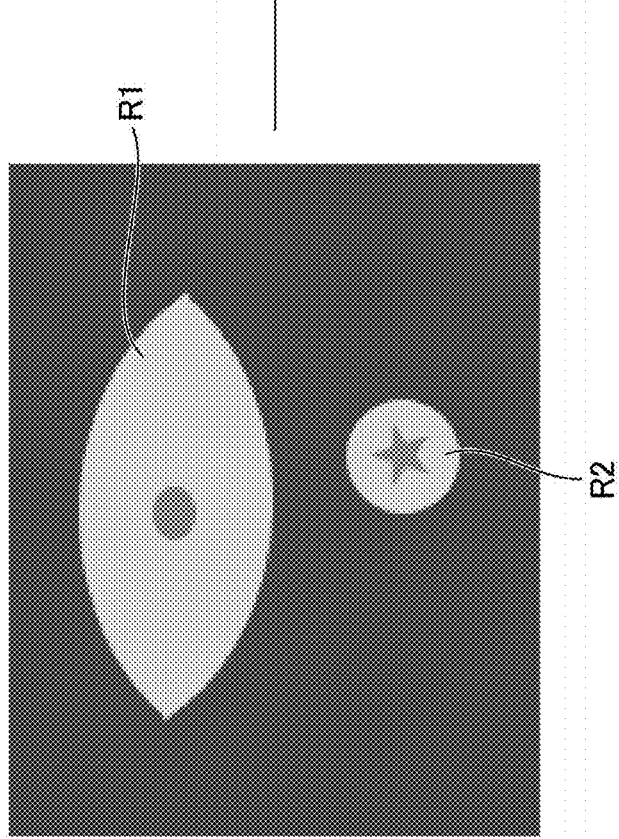

FIGS. 5A and 5B are diagrams illustrating a third example display of a medical image and class information displayed on the monitor.

FIG. 5A illustrates a screen of the monitor 18 at the time of detection of regions of interest R1 and R2, and FIG. 5B illustrates a screen of the monitor 18 after a certain period of time has elapsed since the detection of the regions of interest R1 and R2.

The third example display illustrated in FIGS. 5A and 5B is different from the first example display illustrated in FIGS. 3A and 3B in the display form of the class information at the time of detection of the regions of interest R1 and R2.

As illustrated in FIG. 5A, at the time of detection of the regions of interest R1 and R2, a marker (circle) indicating the pancreas is superimposed as class information at the position of the region of interest R1, and a marker (star) indicating the splenic vein is superimposed as class information at the position of the region of interest R2. The types of class information indicating the classification of regions of interest and the types of markers are associated with each other in advance, thereby enabling the user to check the class information by visually recognizing the type of a marker superimposed at the position of a region of interest.

As illustrated in FIG. 5B, after a certain period of time has elapsed since the detection of the regions of interest R1 and R2, the markers indicating the class information are erased, and class information (the text "Pane." and "SV") indicating the classification of the regions of interest R1 and R2 is displayed outside the regions of interest R1 and R2 in a manner similar to FIG. 3B.

That is, in the third example display illustrated in FIGS. 5A and 5B, after the lapse of a certain period of time, the class information is moved, and the display form of the class information is also changed from a marker to text information.

According to the third example display in FIGS. 5A and 5B, the marker can be displayed smaller than the text information, and accurate position information of the region of interest can be displayed with high visibility. In addition, changing the class information from a marker to text information after the lapse of a certain period of time enables detailed information of the class information to be presented in an easily interpretable form.

Fourth Example Display

FIGS. 6A and 6B are diagrams illustrating a fourth example display of a medical image and class information displayed on the monitor.

FIG. 6A illustrates a screen of the monitor 18 at the time of detection of regions of interest R1 and R2, and FIG. 6B illustrates a screen of the monitor 18 after a certain period of time has elapsed since the detection of the regions of interest R1 and R2.

The fourth example display illustrated in FIGS. 6A and 6B is different from the first example display illustrated in FIGS. 3A and 3B in that highlight information for highlighting each of the regions of interest R1 and R2 is further displayed.

The highlight information for highlighting each of the regions of interests R1 and R2 illustrated in FIGS. 6A and 6B is displayed with the relative positions with respect to the regions of interest R1 and R2 fixed regardless of the passage of time since the detection of the regions of interest R1 and R2. That is, if the regions of interest R1 and R2 move in the medical images in the moving image, the highlight information also moves along with the movement of the regions of interest R1 and R2, whereas the relative positions of the highlight information with respect to the regions of interest R1 and R2 are fixed.

The highlight information illustrated in FIGS. 6A and 6B for highlighting each of the regions of interest R1 and R2 is a rectangular frame (bounding box) surrounding the region of interest. The bounding box surrounding the region of interest can be acquired from the region-of-interest recognition unit 106. The intersection point of the diagonal lines of the bounding box can be set as the center position of the region of interest.

Bounding boxes with the same color (for example, white) and the same line type may be drawn regardless of class information indicating the classification of regions of interest, or bounding boxes with different colors and/or line types may be drawn in accordance with class information indicating the classification of regions of interest. In the latter case, bounding boxes include class information.

The bounding boxes can be displayed such that the regions of interest R1 and R2 are inscribed therein or the bounding boxes are slightly larger than the regions of interest R1 and R2, which does not reduce the visibility of the regions of interest R1 and R2. Thus, no problem occurs even if the bounding boxes are displayed in a fixed manner regardless of the passage of time since the detection of the regions of interest R1 and R2.

The highlight information for highlighting each region of interest is not limited to a bounding box. Examples of the highlight information include a circle and an ellipse surrounding the region of interest, a marker and a geometric shape (having the same shape regardless of the class of the region of interest) arranged in the center of the region of interest, and an arrow indicating the position of the region of interest.

In the first to fourth example displays illustrated in FIGS. 3A to 6B, the class information is distinguishably displayed by using text information (including an abbreviation or acronym), a marker, or the like. Alternatively, the class information may be distinguishably displayed by using a geometric shape. For example, a bounding box with different colors in accordance with class information is included in a geometric shape. In some cases, the display forms of the marker and the geometric shape are not clearly distinguishable. For example, the markers (circle and star) illustrated in FIG. 5A can also be referred to as geometric shapes.

The method of displaying the class information and the method of transition of the position or the like of the class information in accordance with the elapsed time from the detection time are not limited to those in the first to fourth example displays, and various methods are conceivable.

Medical Image Processing Method

First Embodiment

Figure 7:
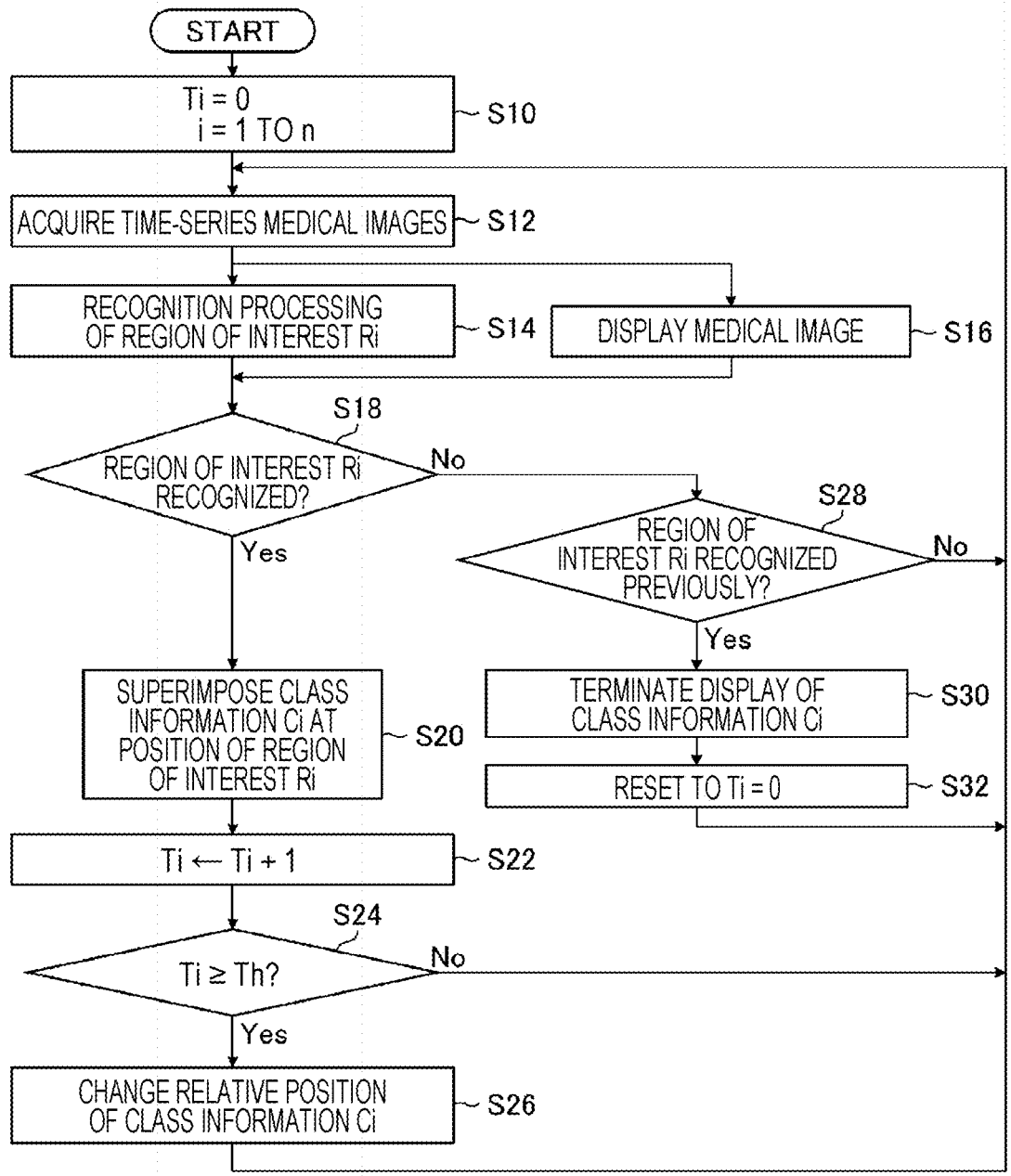
FIG. 7 is a flowchart illustrating a first embodiment of a medical image processing method according to the present invention.

FIG. 7 is a flowchart illustrating a first embodiment of a medical image processing method according to the present invention, and illustrates a processing procedure of the units of the ultrasonic processor device 12 illustrated in FIG. 2.

In FIG. 7, first, the CPU 104 resets the count values of timers Ti, each indicating an elapsed time after a corresponding one of a plurality of regions of interest (in this example, a plurality of organs) is recognized, to 0 (Ti=0) (step S10). Here, i is a parameter indicating types of one to n organs, where n denotes the number of types of organs (the number of classes). Accordingly, T1 is a timer corresponding to the first type of organ, and Tn is a timer corresponding to the N-th type of organ.

The transmitting/receiving unit 100 and the image generation unit 102, which function as a medical image acquisition processing unit, sequentially acquire time-series medical images (step S12). For example, in the case of time-series medical images with a frame rate of 30 fps (frames per second), a medical image for one frame is acquired every 1/30 (seconds).

Then, the region-of-interest recognition unit 106 performs, based on a medical image acquired in step S12, recognition processing of a region of interest (organ) Ri (i=1 to n) present in the medical image (step S14). That is, the region-of-interest recognition unit 106 recognizes the position of a region of interest Ri present in the medical image and recognizes a class (type of organ) indicating the classification of the region of interest Ri. If a plurality of regions of interest are present in the medical image, the position of each of the regions of interest and the class of each of the regions of interest are recognized.

In parallel with the recognition of the region of interest Ri by the region-of-interest recognition unit 106, the first display control unit 110A causes the monitor 18 to display the medical image acquired in step S12 (step S16 (first display control step S16)).

The CPU 104 determines whether the region of interest Ri has been recognized in step S14. If the region of interest Ri has been recognized, the CPU 104 makes a transition to step S20 (second display control step S20) (step S18).

In step S20, the second display control unit 110B causes class information Ci (i=1 to n) indicating the classification of the region of interest Ri to be superimposed on the medical image displayed on the monitor 18 at the position of the region of interest Ri. For example, in the first example display illustrated in FIGS. 3A and 3B, the region of interest R1 indicating the pancreas and the region of interest R2 indicating the splenic vein are recognized. Class information C1 (the text "Panc.") indicating the classification of the region of interest R1 is superimposed at a position near the center of the region of interest R1, and class information C2 (the text "SV") indicating the classification of the region of interest R2 is superimposed at a position near the center of the region of interest R2.

Then, the time measurement processing unit 108 increments the count value of the timer Ti (i=1 to n) by 1 (step S22). In this example, the count value of the timer Ti corresponds to the number of frames in which the region of interest Ri is continuously detected from time-series medical images after the same region of interest Ri is first detected. Accordingly, when the frame rate is 30 fps, the count value of the timer T1 for which the region of interest R1 is continuously detected is 30, which means 1 second. That is, the count value of the timer Ti indicates the elapsed time from the recognition of the region of interest Ri.

Then, the CPU 104 determines whether the count value of the timer Ti is greater than or equal to a threshold value Th (step S24). The threshold value Th can be set to, for example, 45. When the frame rate is 30 fps, the threshold value Th (=45) is converted to a time of 1.5 seconds.

If the count value of the timer Ti is less than the threshold value Th, the CPU 104 makes a transition to step S12. Accordingly, the processing of steps S12 to S24 is repeatedly performed.

On the other hand, if the count value of the timer Ti is greater than or equal to the threshold value Th, the CPU 104 makes a transition to step S26.

In step S26, the second display control unit 110B moves the relative position of the class information Ci, which is superimposed in step S20, with respect to the region of interest Ri in a direction away from the position near the center of the region of interest Ri.

For example, in the first example display illustrated in FIGS. 3A and 3B, as illustrated in FIG. 3A, the display of the class information (the text "Panc." and "SV") indicating the classification of the regions of interest R1 and R2, which is superimposed at positions near the center of the regions of interest R1 and R2, is moved to the outer side of the regions of interest R1 and R2, as illustrated in FIG. 3B.

In this manner, after a certain period of time (in this example, 1.5 seconds) has elapsed since the detection of the region of interest Ri, the class information Ci indicating the classification of the region of interest Ri is moved to the outside of the region of interest Ri to prevent the display of the class information Ci from interfering with the diagnosis of the region of interest Ri.

On the other hand, if it is determined in step S18 that the region of interest Ri has not been recognized (if "No" is determined), the CPU 104 further determines whether the region of interest Ri has been recognized in the previous medical image (one frame before) (step S28).

If it is determined that the region of interest Ri has not been recognized in the previous medical image, the CPU 104 makes a transition to step S12. If it is determined that the region of interest Ri has been recognized in the previous medical image, the CPU 104 makes a transition to step S30.

In step S30, since the region of interest Ri has been recognized in the previous medical image, but the region of interest Ri is not recognized in the current medical image, the second display control unit 110B terminates the display of the class information Ci displayed on the monitor 18.

At the same time as the termination of the display of the class information Ci, the CPU 104 resets the count value of the timer Ti to 0 (step S32), and a transition is made to step S12.

In step S20, the class information Ci to be superimposed at the position of the region of interest Ri is not limited to text information indicating the name or abbreviation of the type of the organ that is the region of interest Ri, and may be any other display form such as a marker or a geometric shape indicating the type of the organ.

In step S26, after a certain period of time has elapsed since the recognition of the region of interest Ri (if the count value of the timer Ti is greater than or equal to the threshold value Th), the class information Ci displayed at a position near the center of the region of interest Ri is moved to the outside of the region of interest Ri. In this case, the direction of movement can be changed in accordance with the class information Ci indicating the classification of the region of interest Ri (see FIG. 4B).

Further, as illustrated in FIGS. 4C and 4D, the class information of a specific class (the text "Panc." indicating the pancreas) may remain unchanged from the position of the region of interest even after the lapse of a certain period of time. In addition, as illustrated in FIG. 4D, the moved class information (the text "MPD") and the region of interest R3 can be connected to each other by a leader line to clarify the relationship therebetween.

Further, as illustrated in FIGS. 5A and 5B, the display form may be changed from a display form using a marker indicating the class information Ci before the lapse of a certain period of time to a display form using text information indicating the class information Ci after the lapse of a certain period of time.

Second Embodiment

Figure 8:
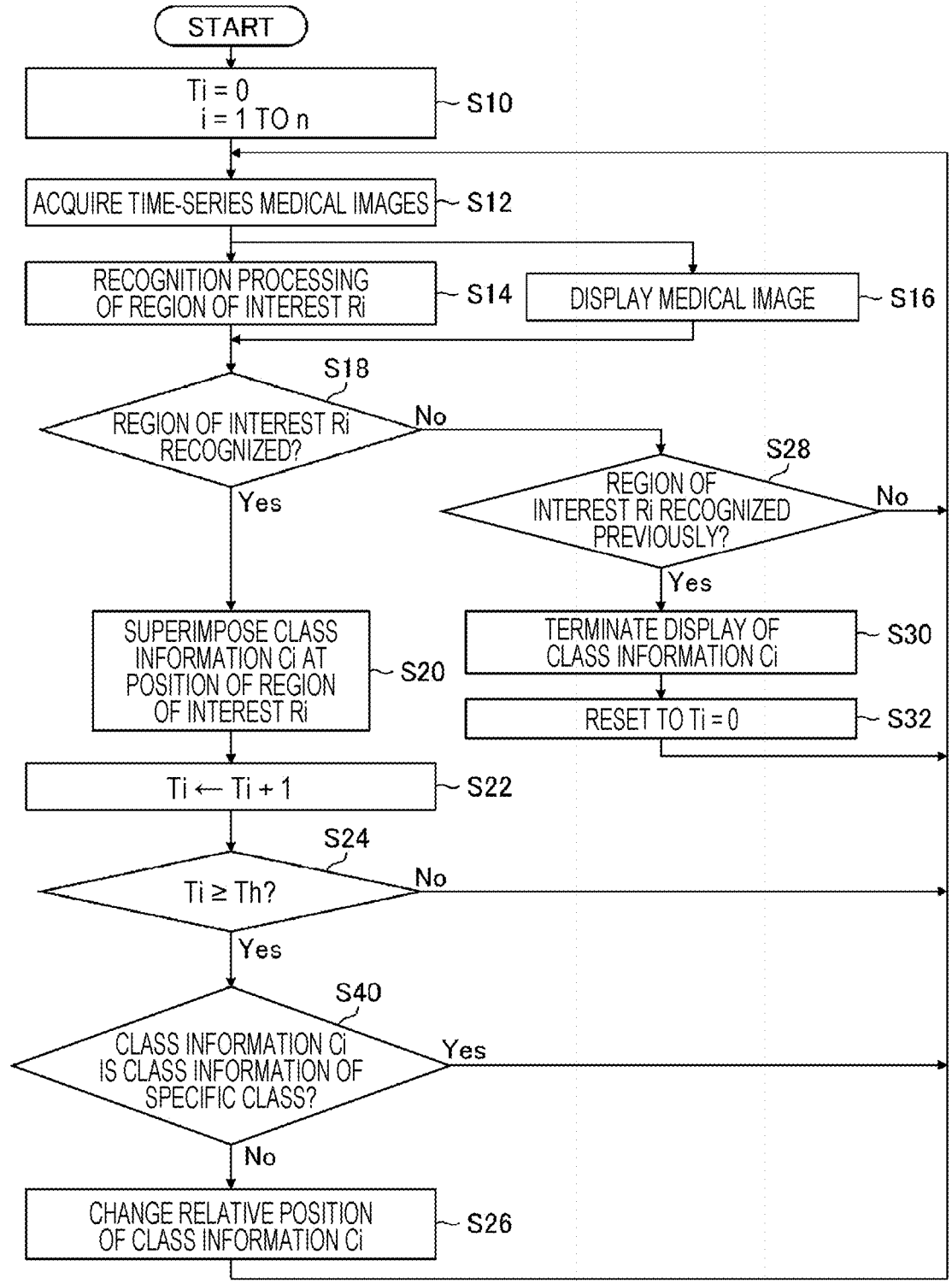
FIG. 8 is a flowchart illustrating a second embodiment of a medical image processing method according to the present invention.

FIG. 8 is a flowchart illustrating a second embodiment of a medical image processing method according to the present invention.

In FIG. 8, steps common to those of the flowchart of the first embodiment illustrated in FIG. 7 are denoted by the same step numbers, and detailed description thereof will be omitted.

The medical image processing method of the second embodiment illustrated in FIG. 8 is different from the medical image processing method of the first embodiment illustrated in FIG. 7 in that the processing of step S40 is added.

In step S40 (second display control step S40) illustrated in FIG. 8, after a certain period of time has elapsed since the recognition of the region of interest Ri (if the count value of the timer Ti is greater than or equal to the threshold value Th), it is further determined whether the class information Ci indicating the classification of the region of interest Ri is class information of a specific class.

If it is determined in step S40 that the class information Ci indicating the classification of the region of interest Ri is class information of a specific class (in the case of "Yes"), a transition is made to step S12. In this case, no transition is made to step S26. Thus, the position of the class information indicating the specific class remains fixed regardless of the elapsed time from the detection of the region of interest of the specific class.

For example, in the example display illustrated in FIGS. 4C and 4D, the class information indicating the specific class (the text "Panc." indicating the pancreas) remains unchanged from the position of the region of interest even after the lapse of a certain period of time.

This is because, in the case of a relatively large region of interest such as the pancreas, class information superimposed on the region of interest does not interfere with observation of the region of interest or is less likely to interfere with observation.

Third Embodiment

FIG. 9 is a flowchart illustrating a third embodiment of a medical image processing method according to the present invention.

In FIG. 9, steps common to those of the flowchart of the first embodiment illustrated in FIG. 7 are denoted by the same step numbers, and detailed description thereof will be omitted.

The medical image processing method of the third embodiment illustrated in FIG. 9 is different from the medical image processing method of the first embodiment illustrated in FIG. 7 in that the processing of steps S50 and S52 is added.

In step S50 illustrated in FIG. 9, it is determined whether a freeze command has been accepted from the handheld operation section 22 of the ultrasound scope 10.

If it is determined that a freeze command has been accepted (in the case of "Yes"), a transition is made to step S52, in which it is determined whether a freeze release command has been accepted. If it is determined in step S52 that no freeze release command has been accepted (in the case of "No"), the process returns to step S50. If it is determined that a freeze release command has been accepted (in the case of "Yes"), a transition is made to step S22.

That is, if a freeze command is accepted, no transition is made to step S12 until a freeze release command is accepted. As a result, the acquisition of a new medical image in step S12 and the sequential display of the new medical image in step S16 are stopped, and the medical image at the time point when the freeze command is accepted remains displayed on the monitor 18 (fixedly displayed as a still image).

If a freeze command is accepted, the class information Ci indicating the classification of the region of interest Ri recognized from the medical image at the time point when the freeze command is accepted is also fixedly displayed for a period of time until a freeze release command is accepted.

In this manner, if a freeze command is accepted, for a period of time until the freeze command is canceled, the medical image displayed on the monitor 18 is fixed to the medical image at the time point when the freeze command is accepted, and is switched from moving image display to still image display. If the region of interest Ri is recognized from the medical image at the time point when the freeze command is accepted, the display of the class information Ci indicating the classification of the region of interest Ri also remains fixed.

Others

In the present embodiment, the ultrasonic processor device 12 includes functions of a medical image processing apparatus according to the present invention. However, the present invention is not limited thereto, and a personal computer or the like separate from the ultrasonic processor device 12 may acquire time-series medical images from the ultrasonic processor device 12 and function as a medical image processing apparatus according to the present invention.

The time-series medical images are not limited to ultrasound images, and may be, for example, time-series endoscopic images captured by the objective lens, the imaging element, and so on disposed in the tip main body 50 of the ultrasound scope 10 and output from the endoscope processor device 14.

Further, the regions of interest in the medical images are not limited to various organs and may be, for example, lesion regions. In this case, examples of the classes of the lesion regions include tumor, non-tumor, and other classes.

The hardware structure for performing various kinds of control of the ultrasonic processor device (medical image processing apparatus) of the embodiment described above is implemented as various processors as described below. The various processors include a CPU (Central Processing Unit), which is a general-purpose processor executing software (program) to function as various control units, a programmable logic device (PLD) such as an FPGA (Field Programmable Gate Array), which is a processor whose circuit configuration is changeable after manufacture, a dedicated electric circuit, which is a processor having a circuit configuration specifically designed to execute specific processing, such as an ASIC (Application Specific Integrated Circuit), and so on.

A single control unit may be configured by one of the various processors or by a combination of two or more processors of the same type or different types (for example, a plurality of FPGAs or a combination of a CPU and an FPGA). Alternatively, a plurality of control units may be configured by a single processor. Examples of configuring a plurality of control units by a single processor include, first, a form in which, as typified by a computer such as a client or server computer, the single processor is configured by a combination of one or more CPUs and software and the processor functions as the plurality of control units. The examples include, second, a form in which, as typified by a system on chip (SoC) or the like, a processor is used in which the functions of the entire system including the plurality of control units are implemented by a single IC (Integrated Circuit) chip. As described above, the various control units are configured using one or more of the various processors described above as a hardware structure.

The present invention further includes a medical image processing program to be installed in a computer to cause the computer to function as a medical image processing apparatus according to the present invention, and a non-volatile storage medium storing the medical image processing program.

Furthermore, it goes without saying that the present invention is not limited to the embodiment described above and various modifications may be made without departing from the spirit of the present invention.

REFERENCE SIGNS LIST 2 ultrasonic endoscope system
10 ultrasound scope
12 ultrasonic processor device
14 endoscope processor device
16 light source device
18 monitor
20 insertion section
20a longitudinal axis
22 handheld operation section
24 universal cord
26 ultrasonic connector
28 endoscope connector
30 light source connector
32, 34 tube
36 air/water supply button
38 suction button
42 angle knob
44 treatment tool insertion port
50 tip main body
52 bending part
54 soft part
62 ultrasound probe
64 balloon
70 water supply tank
72 suction pump
100 transmitting/receiving unit
102 image generation unit
104 CPU
106 region-of-interest recognition unit
108 time measurement processing unit
110 display control unit
110A first display control unit
110B second display control unit
112 memory
C1, C2, Ci class information
R1, R2, R3, Ri region of interest
S10 to S32, S40, S50, S52 step

What is claimed is:

1. A medical image processing apparatus comprising a processor configured to perform:
    a medical image acquisition process for sequentially acquiring time-series medical images;
    first display control for causing a display unit to sequentially display the medical images;
    a process of recognizing, based on the sequentially acquired medical images, information related to a position of a region of interest in the medical images;
    a process of classifying the region of interest into a class among a plurality of classes, based on the sequentially acquired medical images; and
    second display control for displaying class information indicating the class of the classified region of interest such that the class information is superimposed at a position of the region of interest in a medical image displayed on the display unit among the medical images, wherein
    the second display control changes a relative position of the superimposed class information with respect to the region of interest, in accordance with an elapsed time from recognition of the region of interest.

2. The medical image processing apparatus according to claim 1, wherein
    the second display control changes the relative position of the class information in accordance with the elapsed time, such that the relative position of the class information is changed in a direction away from the position of the region of interest.

3. The medical image processing apparatus according to claim 1, wherein
    the second display control fixes a relative position, with respect to the region of interest, of class information indicating one or more specific classes among the plurality of classes.

4. The medical image processing apparatus according to claim 1, wherein
    the second display control changes the relative position of the class information in accordance with the elapsed time, in a manner that changes in accordance with the class of the classified region of interest.

5. The medical image processing apparatus according to claim 1, wherein
    the second display control changes the relative position of the class information in accordance with the elapsed time, such that a display form of the class information is also changed to another display form.

6. The medical image processing apparatus according to claim 1, wherein
    the class information includes at least one of text information, a marker, or a geometric shape indicating the class of the classified region of interest.

7. The medical image processing apparatus according to claim 1, wherein
    the second display control causes the display unit to display highlight information for highlighting the region of interest and fixes a relative position of the highlight information with respect to the region of interest.

8. The medical image processing apparatus according to claim 1, wherein
    the processor is configured to perform an acceptance process for accepting a freeze command from a user operating unit, the first display control performs a process of switching sequential display of the medical images to be displayed on the display unit to fixed display of one of the medical images in response to acceptance of the freeze command, and the second display control fixes the relative position of the class information with respect to the region of interest during a period of time of the fixed display.

9. The medical image processing apparatus according to claim 1, wherein the medical images are ultrasound images.

10. A medical image processing method to be executed by a processor, comprising:

a step of sequentially acquiring time-series medical images;

a first display control step of causing a display unit to sequentially display the medical images;

a step of recognizing, based on the sequentially acquired medical images, information related to a position of a region of interest in the medical images;

a step of classifying the region of interest into a class among a plurality of classes, based on the sequentially acquired medical images; and a second display control step of displaying class information indicating the class of the classified region of interest such that the class information is superimposed at a position of the region of interest in a medical image displayed on the display unit among the medical images, the second display control step changing a relative position of the superimposed class information with respect to the region of interest, in accordance with an elapsed time from recognition of the region of interest.

11. The medical image processing method according to claim 10, wherein the second display control step changes the relative position of the class information in accordance with the elapsed time, such that the relative position of the class information is changed in a direction away from the position of the region of interest.

12. The medical image processing method according to claim 10, wherein the second display control step fixes a relative position, with respect to the region of interest, of class information indicating one or more specific classes among the plurality of classes.

13. The medical image processing method according to claim 10, wherein the second display control step changes the relative position of the class information in accordance with the elapsed time, in a manner that changes in accordance with the class of the classified region of interest.

14. The medical image processing method according to claim 10, wherein the second display control step changes the relative position of the class information in accordance with the elapsed time, such that a display form of the class information is also changed to another display form.

15. The medical image processing method according to claim 10, wherein the class information includes at least one of text information, a marker, or a geometric shape indicating the class of the classified region of interest.

16. The medical image processing method according to claim 10, wherein the second display control step causes the display unit to display highlight information for highlighting the region of interest and fixes a relative position of the highlight information with respect to the region of interest.

17. The medical image processing method according to claim 10, comprising a step of accepting a freeze command from a user operating unit, wherein the first display control step switches sequential display of the medical images to be displayed on the display unit to fixed display of one of the medical images in response to acceptance of the freeze command, and the second display control step fixes the relative position of the class information with respect to the region of interest during a period of time of the fixed display.

18. The medical image processing method according to claim 1, wherein the medical images are ultrasound images.

19. A non-transitory, computer-readable tangible recording medium storing a program for causing, when read by a computer, a processor of the computer to execute the medical image processing method according to claim 10.

* * * * *